US006945580B1

(12) United States Patent
Hentes

(10) Patent No.: US 6,945,580 B1
(45) Date of Patent: Sep. 20, 2005

(54) MOTORIZED PICK-UP BED TOOLBOX

(76) Inventor: Ilie T. Hentes, 2219 Kohler St., Waterford, MI (US) 48329

( * ) Notice: Subject to any disclaimer, the term of this patent is extended or adjusted under 35 U.S.C. 154(b) by 0 days.

(21) Appl. No.: 10/949,563

(22) Filed: Sep. 27, 2004

(51) Int. Cl.[7] ................................................ B60R 9/06
(52) U.S. Cl. ..................................... 296/37.6; 224/404
(58) Field of Search ............................ 296/37.6, 37.1, 296/24.3; 224/404

(56) References Cited

U.S. PATENT DOCUMENTS

| D259,413 S | 6/1981 | Rehkopf |
| 4,522,326 A | 6/1985 | Tuohy, III |
| 4,966,401 A | 10/1990 | Dutro et al. |
| 5,037,153 A | 8/1991 | Stark |
| 5,088,636 A * | 2/1992 | Barajas ..................... 296/37.6 |
| 5,564,767 A | 10/1996 | Strepek |
| 5,685,593 A | 11/1997 | O'Connor |
| 6,354,647 B1 * | 3/2002 | Voves ......................... 296/37.6 |
| 6,474,521 B1 * | 11/2002 | Young ......................... 296/37.6 |
| 6,749,243 B2 * | 6/2004 | Voves ......................... 296/37.6 |
| 2002/0057001 A1 | 5/2002 | Wilding |

* cited by examiner

Primary Examiner—Jason Morrow

(57) ABSTRACT

A motorized pick-up bed toolbox includes a pick-up bed having a bottom wall, a first side wall and a second side wall. A pair of tracks is mounted on the pick-up bed. A housing includes an upper portion and lower portion. The upper portion has a width greater than a distance between the first and second walls and the lower portion has a width less than a distance between the first and second side walls. A plurality of wheels is rotatably coupled to the housing. Each of the wheels is positioned such that at least two wheels are positioned in each of the tracks. A motor mounted in the housing is mechanically coupled to one of the wheels for selectively rotating the wheel in a first direction or a second direction. A control is operationally coupled to the motor for selecting a first or second direction of wheel rotation.

11 Claims, 7 Drawing Sheets

MOTORIZED PICK-UP BED TOOLBOX

BACKGROUND OF THE INVENTION

1. Field of the Invention

The present invention relates to motorized toolbox devices and more particularly pertains to a new motorized toolbox device for selectively moving a toolbox toward and away from an open end of a pick-up bed by way of an automated system.

2. Description of the Prior Art

The use of motorized toolbox devices is known in the prior art. U.S. Pat. No. 5,546,767 describes a device for selectively extending or retracing a drawer slidably mounted on in a pick-up bed. Another type of motorized toolbox device is U.S. Patent Application No. 2002/0057001 A1 which includes a tool box that is mounted on a railing so that that the toolbox can be easily moved within the toolbox. A similar device is found in U.S. Pat. No. 4,522,326.

While these devices fulfill their respective, particular objectives and requirements, the need remains for a device that includes a motor for moving the toolbox within the pick-up bed. This will allow a person requiring access to the toolbox to remain at the tailgate and will not have to reach over the sides of the pick-up bed or enter it in order to have full access to the toolbox.

SUMMARY OF THE INVENTION

The present invention meets the needs presented above by generally comprising a pick-up bed having a bottom wall, a first side wall, a second side wall and a front wall. The bottom wall has a rear edge. A pair of tracks is mounted on the pick-up bed. A housing includes an upper portion and lower portion. The housing has a pair of lateral sides. The upper portion has a width greater than a distance between the first and second walls and the lower portion has a width less than a distance between the first and second side walls such that each that a flange is defined in each of the lateral sides at a juncture of the upper and lower portions. A plurality of wheels is rotatably coupled to and extends downward the housing. Each of the wheels is positioned such that at least two wheels are positioned in each of the tracks. A motor is mounted in the housing and is mechanically coupled to at least one of the wheels for selectively rotating the wheel in a first direction or a second direction. A control is operationally coupled to the motor. The control includes a first direction actuator and a second direction actuator.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
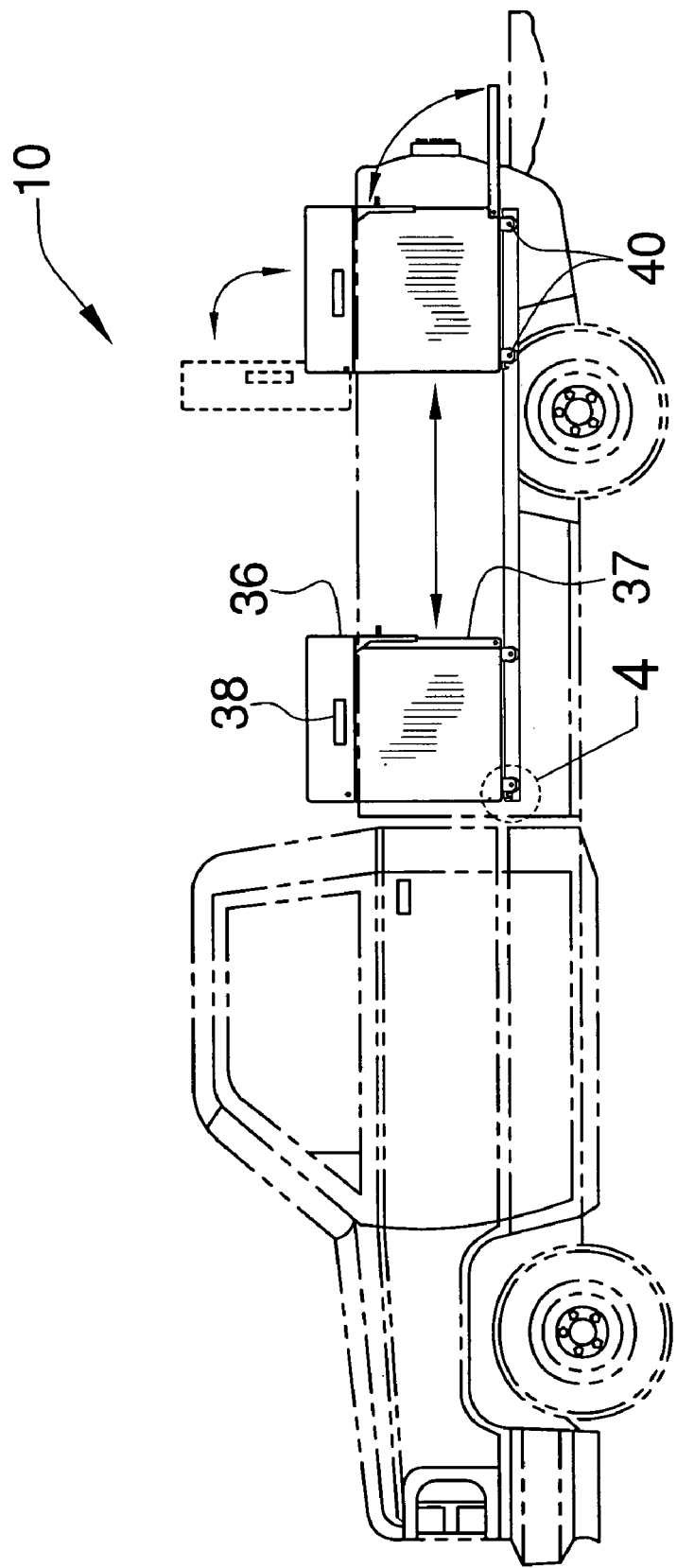
FIG. 1 is a side view of a motorized pick-up bed toolbox according to the present invention.
Figure 2:
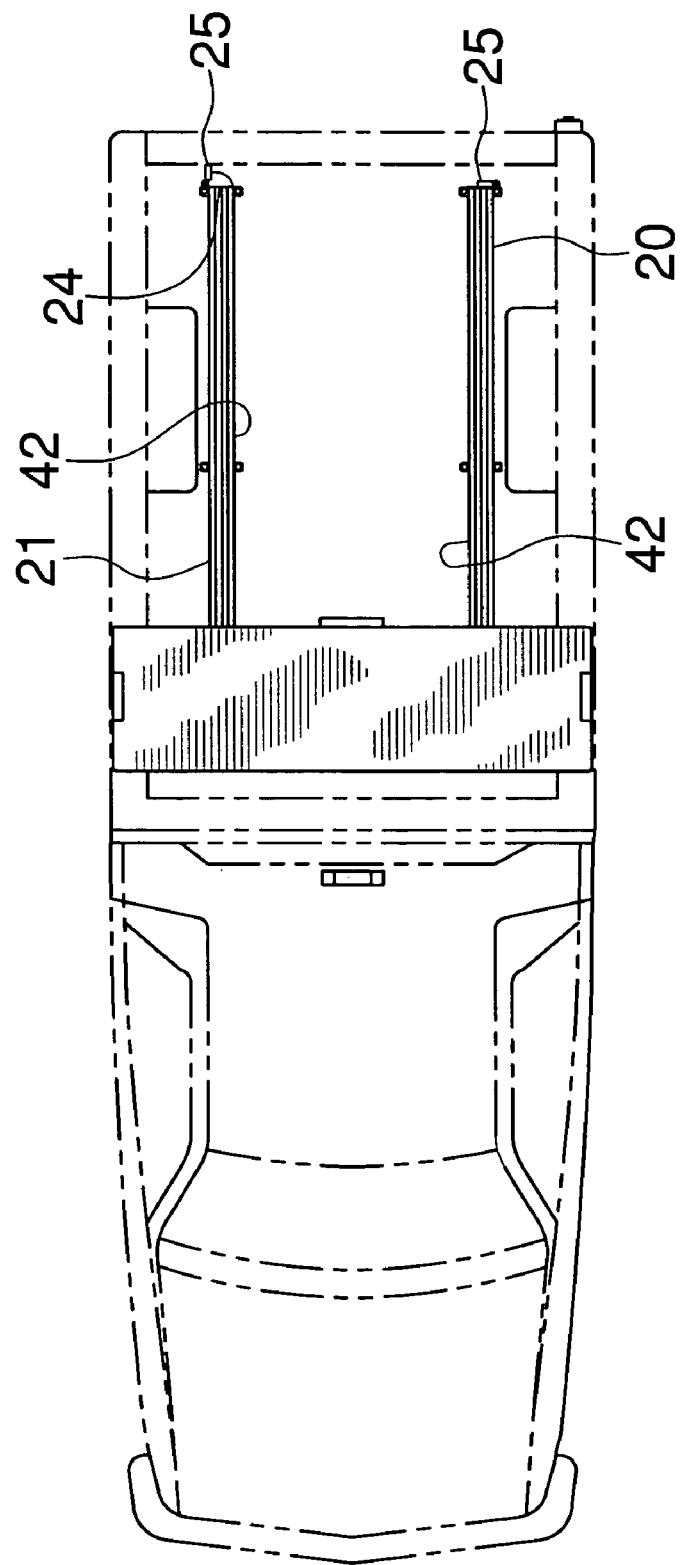
FIG. 2 is a top view of the present invention.
Figure 3:
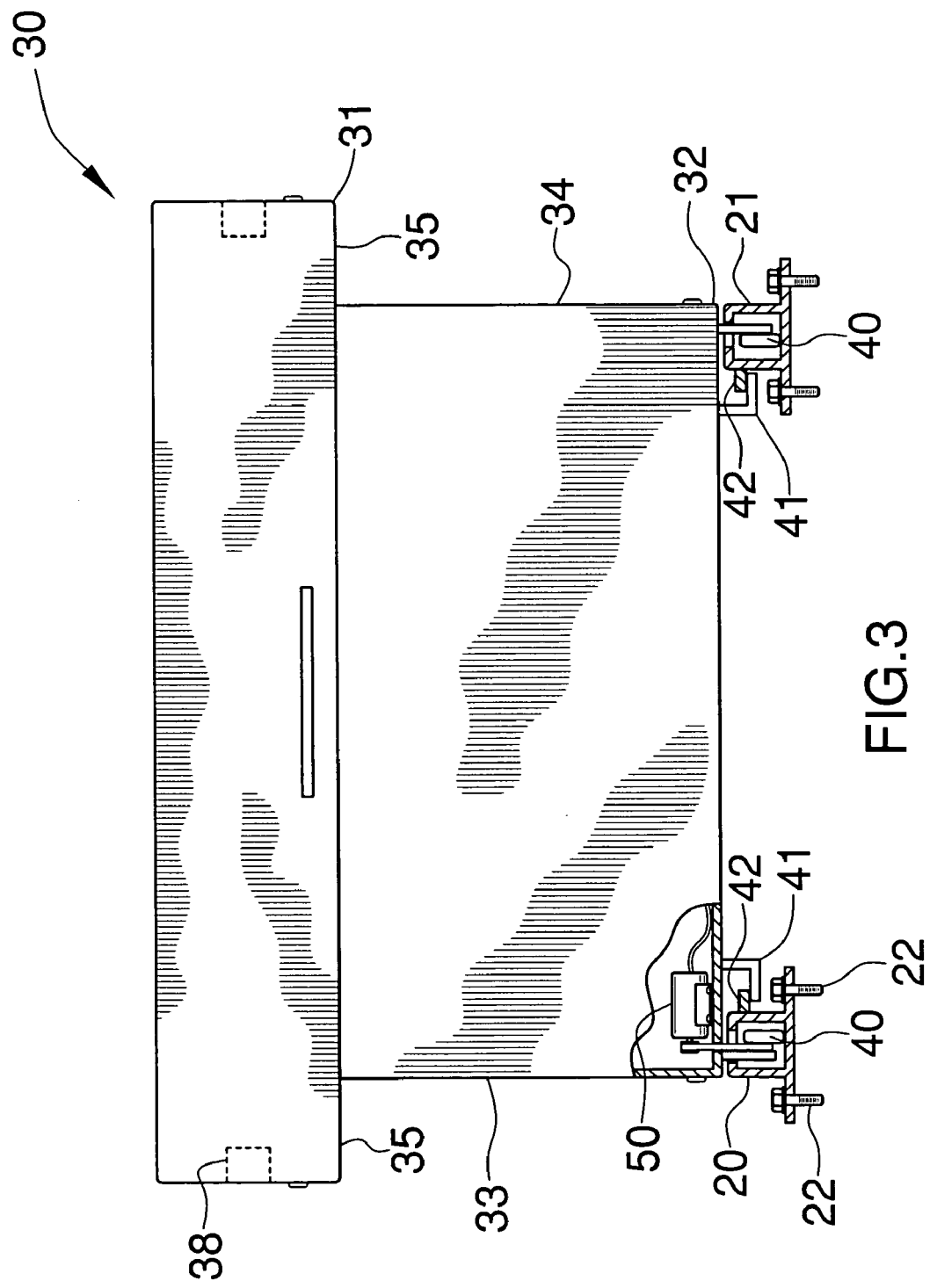
FIG. 3 is a front view of the present invention.

With reference now to the drawings, and in particular to FIGS. 1 through 8 thereof, a new motorized toolbox device embodying the principles and concepts of the present invention and generally designated by the reference numeral 10 will be described.

As best illustrated in FIGS. 1 through 8, the motorized pick-up bed toolbox 10 generally comprises a conventional pick-up bed 12 that has a bottom wall 13, a first side wall 14, a second side wall 15 and a front wall 16. The bottom wall 13 has a rear edge 17. Typically, a tailgate 18 will be hingedly coupled to the rear edge 17.

Each of a pair of tracks 20, 21 is provided. In the first embodiment, shown in FIGS. 1–3, each of the tracks 20, 21 is attached to an upper surface of the bottom wall 13 and extends from the front wall 16 to the rear edge 17. In the second embodiment, shown in FIGS. 6 and 7, each of the tracks 20, 21 is mounted to an upper edge of one of the first 14 and second 15 side walls and generally extends along a length thereof. The tracks 20, 21 are mounted with conventional fasteners 22. For both embodiments it is preferred that each of the tracks 20, 21 are elongated troughs that each have open ends 24 adjacent to the rear edge 17. Release brackets 25 extend over and selectively close the opened ends 24 for reasons which will become apparent below.

A housing 30 is provided that includes an upper portion 31 and lower portion 32. The housing has a pair of lateral sides 33, 34. The upper portion 31 has a width greater than a distance between the first 14 and second 15 walls and the lower portion 32 has a width less than a distance between the first 14 and second 16 side walls such that a flange 35 is defined in each of the lateral sides 33, 34 at a juncture of the upper 31 and lower 32 portions. The flanges 35 extend over the side walls when the housing 30 is positioned in the bed. An upper door 36 is mounted on the housing 30 for accessing an interior of the upper portion 31 and a lower door 37 is mounted on the housing 30 for accessing an interior of the lower portion 32. The housing 30 may include drawers and shelving as needed as is commonly found in conventional toolboxes used in pick-up beds. The housing 30 may also include a lock for locking the upper 36 and lower 37 doors in a closed position. Handles 38 may be incorporated in the lateral sides 33, 34 of the housing 30 for adding in the movement and mounting of the housing 30 into and out of the pick-up bed 12. It should be understood that in the first embodiment, the housing 30 may have a constant width equal to the lower portion 32 so that the housing 30 does not extend over the first 14 and second 15 side walls.

A plurality of wheels 40 of is rotatably coupled to and extends downward the housing 30. Each of the wheels 40 is positioned such that at least two wheels 40 are positioned in each of the tracks 20, 21. In the first embodiment, the wheels 40 are attached to the bottom side of the lower portion 32 while in the second embodiment the wheels 40 are attached to the bottom sides of the flanges 35. The wheels 40 support the housing 30 in such a manner that each of the flanges 35 are spaced from and positioned above the first 14 and second 15 side walls. The release brackets 25 may be opened up to allow the housing 30 to be rolled off of the pick-up bed 12 but are usually closed to prevent the housing from rolling off of the railings 20, 21. One or more L-brackets 41 are attached to the housing 30 and extend below lips 42 extending outwardly from rails 20, 21. The L-brackets 41 retain the housing 30 on the rails 20, 21 in the event that the truck overturns or is involved in an accident.

A motor 50 is mounted in the housing 30 and is mechanically coupled to at least one of the wheels 40 for selectively rotating the at least one of the wheels 40 in a first direction or a second direction. The motor 50 may be mechanically coupled to the wheel 40 with a belt, gears or chain that is attached to an axle supporting the wheel. A control 51 is operationally coupled to the motor 50. The control 51 includes a first direction actuator 52 for causing rotation of the wheel 40 in a first direction and a second direction actuator 53 for causing rotation of the wheel 40 in the second direction.

Figure 4:
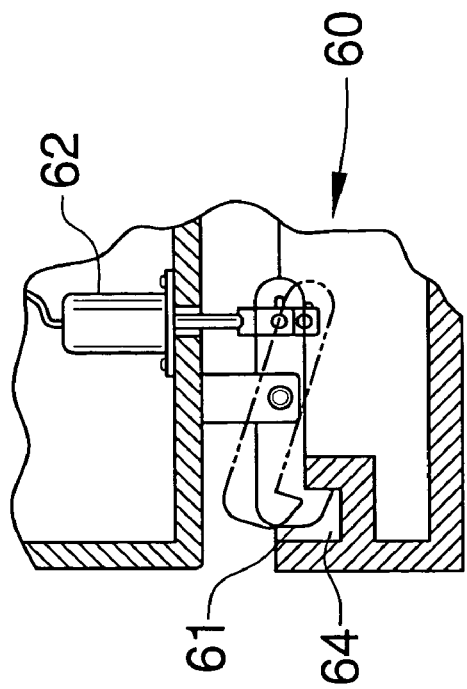
FIG. 4 is an enlarged view of the area designated "4" of FIG. 1 of the present invention.
Figure 5:
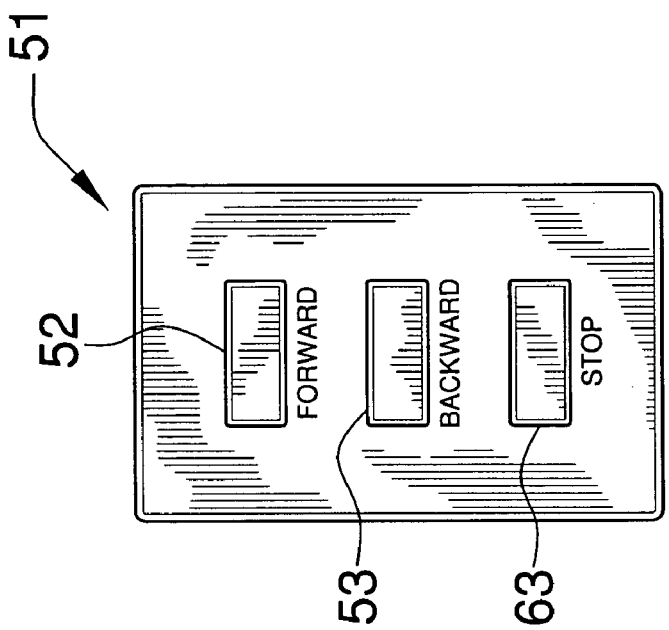
FIG. 5 is a front view of the control of the present invention.
Figure 6:
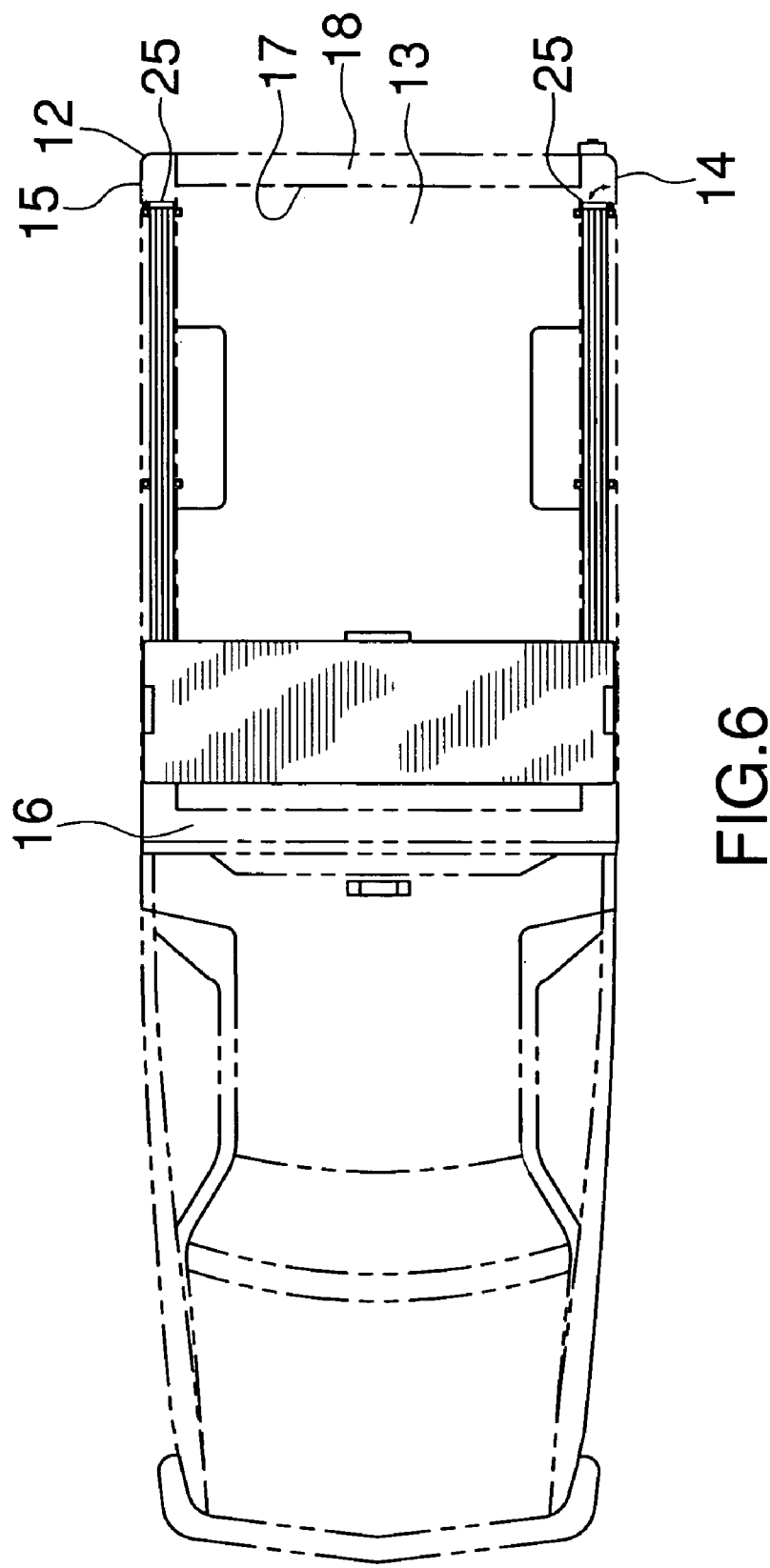
FIG. 6 is a top view of a second embodiment of the present invention.
Figure 7:
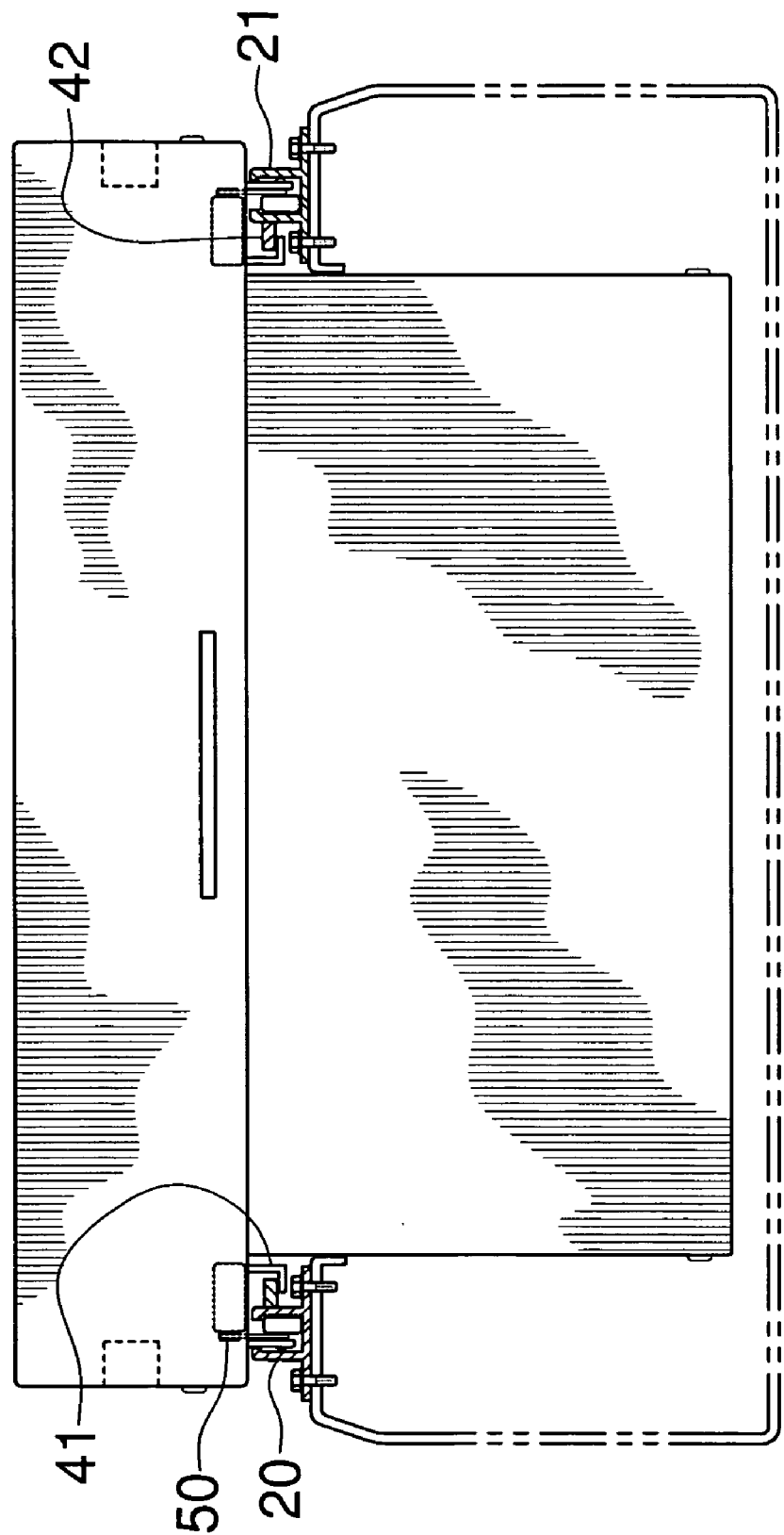
FIG. 7 is a front view of the second embodiment of the present invention.
Figure 8:
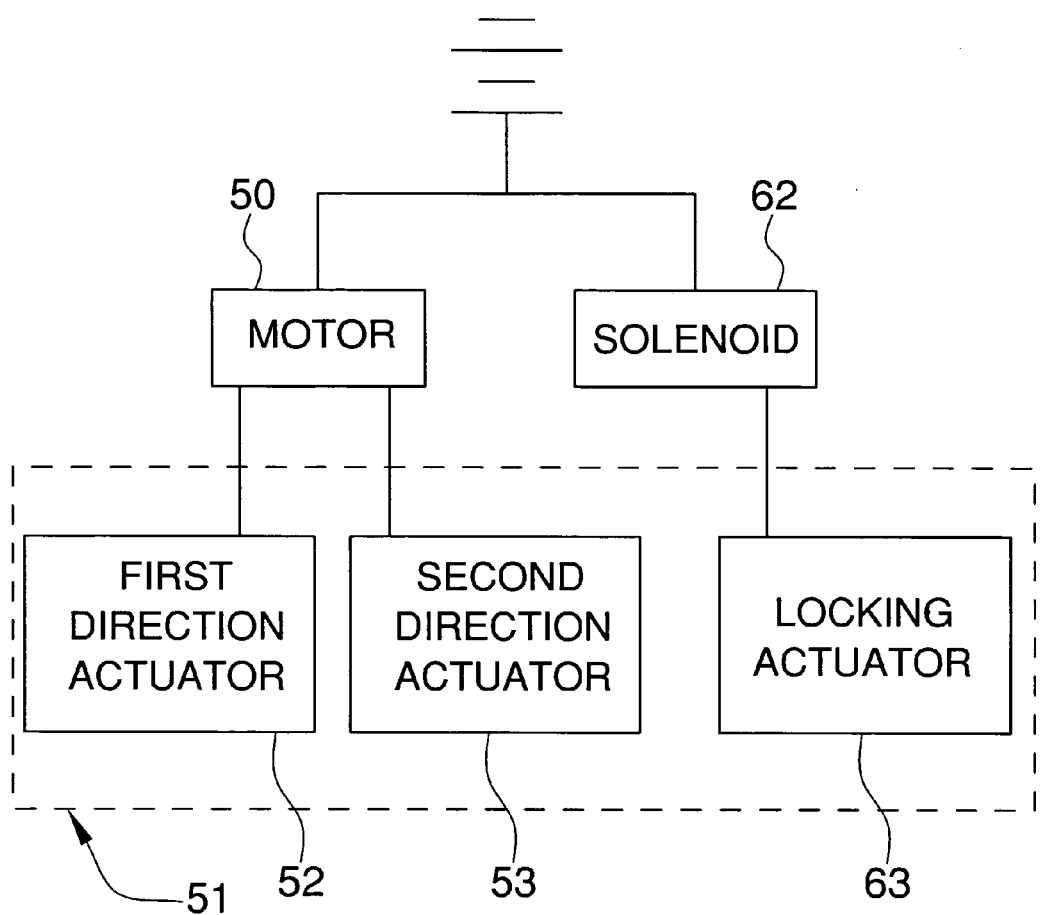
FIG. 8 is an electronic schematic view of the present invention.

A locking assembly 60 is mounted on the housing 30 and is adapted for selectively engaging a first track 20 of the pair of tracks 20, 21 for preventing movement of the housing 30 on the tracks 20, 21. The locking assembly 60 includes a catch 61 that is pivotally coupled to the housing 30 and is selectively positioned in a first position engaging the first track 20 or in a second position spaced from the first track 20. The latch 61 may frictionally engage the track 20 or it may extend into a notch 64 in the track 20 as shown in FIG. 4. A solenoid 62 is mechanically coupled to the latch 61 and is adapted for selectively moving the latch 61 between the first and second positions. The control 51 includes a locking actuator 63 that is operationally coupled to the locking assembly 60. The solenoid 62 preferably places the latch 61 in the second position when it is turned on so that the latch 61 engages the track 20 when there is no power being sent to the solenoid 62. The locking actuator 63 may be incorporated with the first 52 and second 53 direction actuators so that the latch 61 is released from the railing 21 when either of the first 52 and second 53 actuators is actuated.

In use, the motor 50 allows the user of the system 10 to move the housing toward the rear of the truck so that tools therein may be readily accessed without having to enter the pick-up bed 12. The first direction actuator 52 moves the housing 30 toward the tailgate 18 while the second direction actuator 53 moves the housing toward a cab of the pick-up. The locking assembly 60 prevents unwanted movement of the housing 30 within the pick-up bed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for selectively moving a storage box along the length of a pick-up bed, said system comprising:
 a pick-up bed having a bottom wall, a first side wall, a second side wall and a front wall, said bottom wall having a rear edge;
 a pair of tracks being mounted on said pick-up bed;
 a housing;
 a plurality of wheels being rotatably coupled to and extending downwardly from said housing, each of said wheels being positioned such that at least two wheels are positioned in each of said tracks;
 a motor being mounted in said housing and being mechanically coupled to at least one of said wheels for selectively rotating said at least one of said wheels in a first direction or a second direction;
 a control being operationally coupled to said motor, said control including a first direction actuator and a second direction actuator.

2. The system according to claim 1, wherein each of said tracks is mounted to an upper edge of one of said first and second side walls and generally extends along a length thereof.

3. The system according to claim 1, wherein each of said tracks is mounted to an upper surface of said bottom wall and each extends from said front wall to said rear edge.

4. The system according to claim 1, further including an upper door being mounted on said housing for accessing an interior of said upper portion, a lower door being mounted on said housing for accessing an interior of said lower portion.

5. The system according to claim 1, further including a locking assembly being mounted on said housing and being adapted for selectively engaging a first track of said pair or tracks for preventing movement of said housing on said tracks.

6. The system according to claim 5, wherein said locking assembly includes a catch being pivotally coupled to said housing and being selectively positioned in a first position engaging said first track or in a second position spaced from said first track, a solenoid being mechanically coupled to said latch and being adapted for selectively moving said latch between said first and second positions, said control including a locking actuator being operationally coupled to said locking assembly.

7. The system according to claim 2, further including a locking assembly being mounted on said housing and being adapted for selectively engaging a first track of said pair of tracks for preventing movement of said housing on said tracks.

8. The system according to claim 7, wherein said locking assembly includes a catch being pivotally coupled to said housing and being selectively positioned in a first position engaging said first track or in a second position spaced from said first track, a solenoid being mechanically coupled to said latch and being adapted for selectively moving said latch between said first and second positions, said control including a locking actuator being operationally coupled to said locking assembly.

9. The system according to claim 3, further including, a locking assembly being mounted on said housing and being adapted for selectively engaging a first track of said pair of tracks for preventing movement of said housing on said tracks.

10. The system according to claim 9, wherein said locking assembly includes a catch being pivotally coupled to said housing and being selectively positioned in a first position engaging said first track or in a second position spaced from said first track, a solenoid being mechanically coupled to said latch and being adapted for selectively moving said latch between said first and second positions, said control including a locking actuator being operationally coupled to said locking assembly.

11. A system for selectively moving a storage box along the length of a pick-up bed, said system comprising:

- a pick-up bed having a bottom wall, a first side wall, a second side wall and a front wall, said bottom wall having a rear edge;
- a pair of tracks, each of said tracks being mounted to an upper edge of one of said first and second side walls and generally extending along a length thereof, each of said tracks having closed ends positioned adjacent to said rear edge;
- a housing including an upper portion and lower portion, said housing having a pair of lateral sides, said upper portion having a width greater than a distance between said first and second walls and said lower portion having a width less than a distance between said first and second side walls such that a flange is defined in each of said lateral sides at a juncture of said upper and lower portions, an upper door being mounted on said housing for accessing an interior of said upper portion, a lower door being mounted on said housing for accessing an interior of said lower portion;
- a plurality of wheels being rotatably coupled to and extending downwardly from said housing, each of said wheels being positioned such that at least two wheels are positioned in each of said tracks, said wheels supporting said housing such that each of said flanges are spaced from and positioned above said first and second side walls;
- a motor being mounted in said housing and being mechanically coupled to at least one of said wheels for selectively rotating said at least one of said wheels in a first direction or a second direction;
- a control being operationally coupled to said motor, said control including a first direction actuator and a second direction actuator; and a locking assembly being mounted on said housing and being adapted for selectively engaging a first track of said pair of tracks for preventing movement of said housing on said tracks, said locking assembly including a catch being pivotally coupled to said housing and being selectively positioned in a first position engaging said first track or in a second position spaced from said first track, a solenoid being mechanically coupled to said latch and being adapted for selectively moving said latch between said first and second positions, said control including a locking actuator being operationally coupled to said locking assembly.

\* \* \* \* \*